US009160004B2

United States Patent
Kasahara et al.

(10) Patent No.: US 9,160,004 B2
(45) Date of Patent: Oct. 13, 2015

(54) LITHIUM ION SECONDARY BATTERY

(75) Inventors: Ryuichi Kasahara, Tokyo (JP); Jiro Iriyama, Tokyo (JP); Kazuhiko Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/345,590

(22) PCT Filed: Sep. 13, 2012

(86) PCT No.: PCT/JP2012/073492
§ 371 (c)(1),
(2), (4) Date: Mar. 18, 2014

(87) PCT Pub. No.: WO2013/042610
PCT Pub. Date: Mar. 28, 2013

(65) Prior Publication Data
US 2014/0356711 A1     Dec. 4, 2014

(30) Foreign Application Priority Data
Sep. 22, 2011   (JP) .................................. 2011-207690

(51) Int. Cl.
| H01M 4/62 | (2006.01) |
| H01M 10/052 | (2010.01) |
| H01M 4/134 | (2010.01) |
| H01M 4/36 | (2006.01) |
| H01M 4/38 | (2006.01) |
| H01M 10/0525 | (2010.01) |
| H01M 4/02 | (2006.01) |

(52) U.S. Cl.
CPC .............. *H01M 4/622* (2013.01); *H01M 4/134* (2013.01); *H01M 4/364* (2013.01); *H01M 4/382* (2013.01); *H01M 4/386* (2013.01); *H01M 10/052* (2013.01); *H01M 10/0525* (2013.01); *H01M 2004/027* (2013.01); *Y02E 60/122* (2013.01); *Y02T 10/7011* (2013.01)

(58) Field of Classification Search
None
See application file for complete search history.

(56) References Cited

PUBLICATIONS

Behniafar, et. al., Novel modified aromatic polyamides and polyimides derived from a diphenyl ether-based diamine containing laterally-attached phenoxy phenylene groups, Advanced Materials Research (2010), 93-94, pp. 255-258.*

* cited by examiner

*Primary Examiner* — Cynthia K Walls
(74) *Attorney, Agent, or Firm* — Finnegan, Henderson, Farabow, Garrett & Dunner LLP

(57) ABSTRACT

In a lithium ion secondary battery including a positive electrode, a separator, and a negative electrode opposed to the positive electrode with an intervention of the separator, the negative electrode includes a negative electrode active material including a silicon compound, and a negative electrode binder including a particular polyimide, and lithium is occluded in both the negative electrode active material and the negative electrode binder even during discharge.

12 Claims, 1 Drawing Sheet

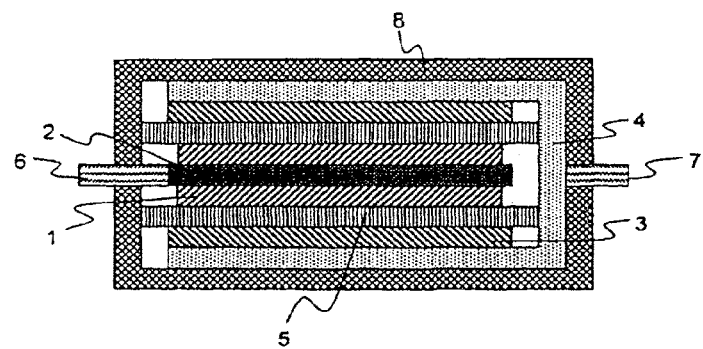

LITHIUM ION SECONDARY BATTERY

CROSS-REFERENCE TO RELATED PATENT APPLICATIONS

This application is a National Stage Entry of International Application No. PCT/JP2012/073492, filed Sep. 13, 2012, which claims priority from Japanese Patent Application No. 2011-207690, filed Sep. 22, 2011. The entire contents of the above-referenced applications are expressly incorporated herein by reference.

TECHNICAL FIELD

The present invention relates to a lithium ion secondary battery.

BACKGROUND ART

With the spread of mobile equipment, such as cellular phones and notebook computers, the role of secondary batteries, which are the power sources of the mobile equipment, is regarded as important. These secondary batteries are required to be of small size, light weight, and high capacity, and be less likely to cause the deterioration of charge and discharge capacity even if charge and discharge are repeated. As secondary batteries that satisfy such characteristics, many lithium ion secondary batteries are currently used. In addition, in recent years, a market for motor-driven vehicles, such as electric cars and hybrid cars, has taken off rapidly, and further, the development of home and industrial electricity storage systems has been accelerated. Accordingly, further development of high performance lithium ion secondary batteries has been promoted.

Carbon, such as graphite and hard carbon, is mainly used for the negative electrodes of lithium ion secondary batteries. With carbon, a charge and discharge cycle can be repeated well, but a capacity around the theoretical capacity has already been achieved, and therefore, a significant improvement in capacity cannot be expected in the future. On the other hand, the demand for an improvement in the capacity of lithium ion secondary batteries is strong, and therefore, studies of negative electrode materials having higher capacity, that is, higher energy density, than carbon are performed.

For a material that increases energy density, the use of a Li-occluding substance that forms an alloy with lithium, represented by the composition formula $Li_XA$ (A includes an element such as aluminum), as a negative electrode active material, is studied. This negative electrode active material has a large amount of occluded and released lithium ions per unit volume and high capacity.

In addition, Non Patent Literature 1 describes the use of silicon as a negative electrode active material. It is disclosed that by using such a negative electrode active material, a secondary battery with high energy density is obtained.

Patent Literature 1 describes a nonaqueous electrolyte secondary battery using a silicon oxide or a silicate containing lithium as a negative electrode active material. It is disclosed that by using such a negative electrode active material, a secondary battery with high energy density, excellent charge and discharge characteristics, and excellent cycle life is obtained.

Patent Literature 2 describes a negative electrode for a lithium secondary battery obtained by sintering under a non-oxidizing atmosphere using silicon and/or a silicon alloy as a negative electrode active material and a polyimide as a negative electrode binder. It is disclosed that by using such a negative electrode, a secondary battery with excellent cycle characteristics is obtained.

On the other hand, Patent Literature 3 describes a nonaqueous electrolyte secondary battery in which metal lithium foil previously affixed to a positive electrode is electrochemically diffused in the carbon material of a negative electrode, and lithium capable of discharging is retained in the carbon material of the negative electrode. It is disclosed that in this secondary battery, the capacity of the affixed metal lithium foil is 4 to 40% with respect to the saturation reversible capacity of the carbon material used for the negative electrode.

Patent Literature 4 describes a nonaqueous electrolyte secondary battery characterized in that lithium is allowed to previously exist in a negative electrode portion not opposed to a positive electrode. As a method for allowing lithium to exist in the negative electrode portion, affixing lithium or electrochemically doping with lithium is described. It is disclosed that in this secondary battery, the amount of metal lithium allowed to previously exist in the negative electrode portion not opposed to the positive electrode is 0.10 to 3.00 mg per 1 $cm^2$ of the negative electrode.

Patent Literature 5 describes a nonaqueous secondary battery characterized in that the negative electrode includes a material in which $SiO_X$ ($0.3 \leq x \leq 1.6$) is predoped with lithium. It is disclosed that when the atomic ratio Lp of lithium released from the positive electrode and occluded in the negative electrode to the negative electrode Si, and the atomic ratio Ln of lithium with which the negative electrode is predoped to the negative electrode Si satisfy particular conditions, the energy density and the average voltage are improved, and good rate characteristics are obtained.

CITATION LIST

Patent Literature

Patent Literature 1: JP06-325765A
Patent Literature 2: JP2004-022433A
Patent Literature 3: JP5-144471A
Patent Literature 4: JP7-192766A
Patent Literature 5: JP2009-076372A

Non Patent Literature

Non Patent Literature 1: Li and four others, "A High Capacity Nano-Si Composite Anode Material for Lithium Rechargeable Batteries", Electrochemical and Solid-State Letters, Vol. 2, No. 11, p.547-549 (1999)

SUMMARY OF INVENTION

Technical Problem

As described in Non Patent Literature 1, a battery using silicon as a negative electrode active material has a large amount of occluded and released lithium ions per unit volume and high capacity. But, problems are that pulverization due to the fact that the electrode active material itself expands and shrinks when lithium ions are occluded and released proceeds, and thus the charge and discharge cycle life is short.

In addition, as described in Patent Literature 1, in a secondary battery using a silicon oxide as a negative electrode active material, the energy density tends to be improved, but a problem is that because of the large irreversible capacity in the first charge and discharge, the extent of the improvement in energy density is not sufficient.

Further, as described in Patent Literature 2, in a secondary battery using silicon and/or a silicon alloy as a negative electrode active material and a polyimide as a negative electrode binder, a problem is that pulverization due to the fact that the electrode active material itself expands and shrinks when lithium ions are occluded and released proceeds, and therefore the charge and discharge cycle life is short. By using a polyimide as a negative electrode binder, the charge and discharge cycle life can be improved to some extent, but the extent of the improvement is not sufficient.

In the methods described in Patent Literatures 3 to 5, a rapid decrease in capacity occurs, and the cycle characteristics are insufficient.

It is an object of the present invention is to provide a lithium ion secondary battery having good cycle characteristics and high energy density.

Solution to Problem

A lithium ion secondary battery according to an exemplary embodiment includes a positive electrode, a separator, and a negative electrode opposed to the positive electrode with an intervention of the separator, the negative electrode includes a negative electrode active material including at least a silicon compound, and a negative electrode binder, the negative electrode binder includes a polyimide represented by formula (1):

[Formula 1]

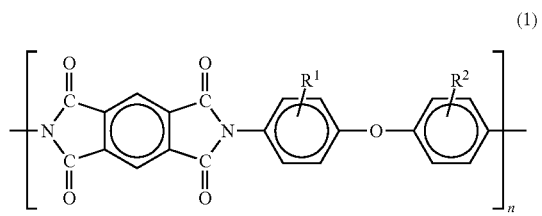

(1)

wherein $R^1$ and $R^2$ each independently represent an alkyl group, an alkoxy group, an acyl group, a phenyl group, or a phenoxy group, and lithium is occluded in both the negative electrode active material and the negative electrode binder even during discharge.

Advantageous Effect of Invention

An exemplary embodiment can provide a lithium ion secondary battery having good cycle characteristics and high energy density.

BRIEF DESCRIPTION OF DRAWING

The figure is a schematic cross-sectional view for explaining one example of the structure of a lithium ion secondary battery according to an exemplary embodiment.

DESCRIPTION OF EMBODIMENT

A lithium ion secondary battery according to an exemplary embodiment has a structure in which a positive electrode, a separator, and a negative electrode are laminated in this order. This negative electrode includes a negative electrode active material including at least a silicon compound containing Si, and a negative electrode binder. This negative electrode binder includes a particular polyimide represented by the above formula (1). In this negative electrode, Li is occluded in both the above negative electrode active material and the above negative electrode binder even during discharge. It is preferred that in this negative electrode, Li is occluded in both the above negative electrode active material and the above negative electrode binder even during discharge when the battery voltage is 3.0 V or less. In addition, this negative electrode is preferably doped with lithium.

This lithium ion secondary battery preferably satisfies the following formula (i):

$$1.2 \leq Ma/Mc \leq 1.9 \quad \text{(i)}$$

wherein an amount of lithium inserted into the negative electrode until the negative electrode reaches a potential of 0.02 V with respect to metal lithium is $M_a$ (a number of atoms), and an amount of lithium released from the positive electrode until the positive electrode reaches a potential of 4.3 V with respect to metal lithium is $M_c$ (a number of atoms).

In addition, this lithium ion secondary battery preferably satisfies the following formula (ii):

$$2 \leq A/B \leq 20 \quad \text{(ii)}$$

wherein the amount of lithium (the number of atoms) in the above negative electrode active material and the amount of lithium (the number of atoms) in the above negative electrode binder during discharge when the battery voltage is 3.0 V or less are A and B, respectively.

The above negative electrode binder is preferably a polyimide that can form a lithium polyimide represented by formula (2):

[Formula 2]

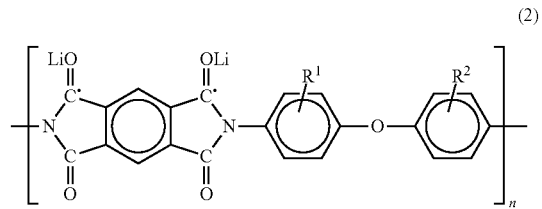

(2)

wherein $R^1$ and $R^2$ represent the same groups as $R^1$ and $R^2$ in formula (1), respectively, by a reversible reaction with lithium ions, with charge and discharge.

As the above negative electrode binder, polyimides in which $R^1$ and $R^2$ in formula (1) are each independently an alkyl group or an alkoxy group can be used. In addition, as the above negative electrode binder, polyimides in which $R^1$ and $R^2$ in formula (1) are each independently a methyl group or a methoxy group can be used.

In addition, as the above negative electrode binder, a polyimide represented by formula (3) or formula (4) can be used.

[Formula 3]

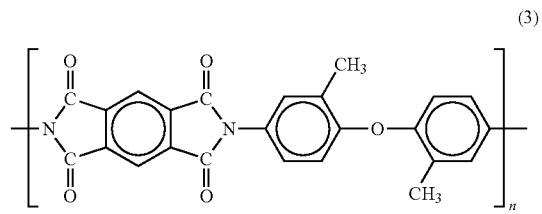

(3)

[Formula 4]

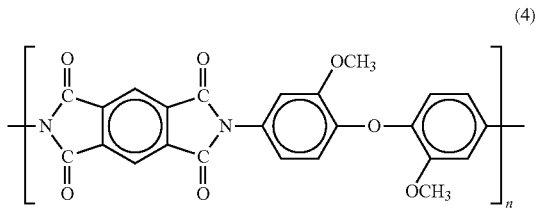

(4)

The above negative electrode may further contain carbon. As this silicon compound, silicon oxide can be used.

According to this exemplary embodiment, the negative electrode binder including the above particular polyimide has the function of binding the negative electrode active material integrally and adhering it to a current collector, and has the active material function of reacting reversibly with lithium ions by charge and discharge, and therefore, the energy density of the battery can be improved.

In addition, in the above polyimide that has the active material function in this manner and can occlude lithium, the ring opening of the imide ring accompanying charge and discharge is suppressed, and these functions can be maintained over a long period. As a result, in the secondary battery according to this exemplary embodiment, with higher density of battery energy, the charge and discharge cycle characteristics can be improved to promote longer life.

This exemplary embodiment will be described further.

A lithium ion secondary battery according to this exemplary embodiment includes a negative electrode including a negative electrode current collector 2, such as copper foil, and negative electrode active material layers 1 formed on the surfaces of the negative electrode current collector 2, and a positive electrode including positive electrode current collectors 4, such as aluminum, and positive electrode active material layers 3 formed on surfaces of the positive electrode current collectors 4, as shown in the figure. The negative electrode active material layer 1 and the positive electrode active material layer 3 are disposed opposed to each other via a separator 5. Portions where the separator 5 and the negative electrode active material layer 1 are disposed opposed to each other, and portions where the separator 5 and the positive electrode active material layer 3 are disposed opposed to each other are impregnated with an electrolytic solution. A negative electrode terminal 6 and a positive electrode terminal 7 are connected to the negative electrode current collector 2 and the positive electrode current collectors 4, respectively, for taking out the electrodes. In an example shown in the figure, the negative electrode active material layers are provided on both surfaces of the negative electrode current collector 2, and the positive electrode active material layers are disposed on respective negative electrode active material layers via the separators, and the two positive electrode current collectors are connected to each other at their ends by welding or the like. Further, laminates including negative electrode active material layers on negative electrode current collectors, positive electrode active material layers on positive electrode current collectors, and separators between the positive electrode active material layers and the negative electrode active material layers may be laminated. The positive electrode current collectors can be connected to each other at their ends by welding or the like, and the negative electrode current collectors can be connected to each other at their ends by welding or the like. The element formed in this manner is sealed in an exterior body 8.

Here, the area of the surface Fa of the negative electrode active material layer opposed to the positive electrode active material layer is preferably smaller than the area of the surface Fc of the positive electrode active material layer opposed to the negative electrode active material layer. In addition, the negative electrode active material layer is preferably disposed so that the entire surface Fa opposed to the positive electrode active material layer is opposed to the surface $F_c$ of the positive electrode active material layer. If the area of the surface Fa of the negative electrode active material layer is too larger than the area of the positive electrode active material layer Fc, the difference in the degree of the volume change of the negative electrode between a portion opposed to the positive electrode and a portion not opposed to the positive electrode increases. As a result, wrinkles, cuts, or the like occur in the negative electrode, which may lead to decrease in the battery characteristics.

In the negative electrode in this exemplary embodiment, as the binder, a polyimide represented by formula (1) is used.

$R^1$ and $R^2$ in formula (1) each independently represent an alkyl group, an alkoxy group, an acyl group, a phenyl group, or a phenoxy group. It is preferable that $R_1$ and $R^2$ are each independently an alkyl group or an alkoxy group.

As the alkyl group, one having 1 to 6 carbon atoms is preferred, a methyl group, an ethyl group, or a propyl group is more preferred, and a methyl group is particularly preferred. As the alkoxy group, one having 1 to 6 carbon atoms is preferred, a methoxy group, an ethoxy group, or a propoxy group is more preferred, and a methoxy group is particularly preferred. As the acyl group, one having 2 to 6 carbon atoms is preferred, and examples of the acyl group can include an acetyl group and a propionyl group.

$R_1$ and $R^2$ may be bonded at any positions of the respective phenylene groups of the phenyl ether group, and are preferably bonded at position 2 and position 2'.

As the polyimide represented by formula (1), particularly, the polyimide represented by formula (3) or formula (4) is preferred.

In the polyimide having such a structure, lithium is occluded when charge is performed once, and therefore, the ring opening of the imide ring accompanying charge and discharge is suppressed, and the action of binding an active material and the action of adhering an active material layer to a current collector can be maintained over a long period.

A polyimide in which n in formula (1) is 20 to 150 can be used, and n is preferably about 50 to 130. In addition, for the polyimide represented by formula (1), one having an average molecular weight of 10,000 to 50,000 or less can be used, and the average molecular weight is preferably 20,000 to 50,000. This average molecular weight of the polyimide can be measured as standard polystyrene equivalent number average molecular weight by gel permeation chromatography (GPC). The polyimide having such an average molecular weight has moderate viscosity, and can exhibit sufficient binding performance.

The negative electrode in this exemplary embodiment may comprise other binders, such as other polyimides excluding the polyimide represented by formula (1) and polyamide-imides. However, in terms of not inhibiting the desired effect, the mass ratio of the other binders to all negative electrode binders is preferably 30% by mass or less, more preferably 20% by mass or less, and further preferably 10% by mass or less.

In the lithium ion secondary battery according to this exemplary embodiment, Li is occluded in both the negative electrode binder including the polyimide represented by formula (1) and the negative electrode active material even during discharge. The negative electrode of this battery is preferably doped with lithium.

The lithium ion secondary battery according to this exemplary embodiment preferably satisfies Ma/Mc>1, and more preferably satisfies the following formula (i):

$$1.2 \leq Ma/Mc \leq 1.9 \quad \text{(i)}$$

wherein the amount of lithium inserted into the negative electrode until the negative electrode reaches a potential of 0.02 V with respect to metal lithium is $M_a$ (the number of atoms), and the amount of lithium released from the positive electrode until the positive electrode reaches a potential of 4.3 V with respect to metal lithium is $M_c$ (the number of atoms). The negative electrode may be doped with Li, as required, so as to satisfy formula (i).

According to this exemplary embodiment, Li is also occluded in the binder, and therefore, the energy density and the cycle characteristics can be improved. In addition, by satisfying formula (i), the energy density and the cycle characteristics can be further improved. In addition, the lithium ion secondary battery according to this exemplary embodiment preferably satisfies the following formula (ii):

$$2 \leq A/B \leq 20 \quad \text{(ii)}$$

wherein the amount of lithium (the number of atoms) in the negative electrode active material and the amount of lithium (the number of atoms) in the negative electrode binder during discharge when the battery voltage is 3.0 V or less are A and B, respectively. This ratio A/B (atomic ratio) is more preferably 4 or more and 12 or less. When A/B is too small, the amount of the binder is large with respect to the amount of the active material, or the amount of lithium occluded in the active material is insufficient, and thus, the energy density may decrease. In addition, because lithium silicate and lithium oxide are formed in the active material, the lithium ion secondary battery is unstable, and the cycle characteristics may decrease. When A/B is too large, the amount of the binder is small with respect to the amount of the active material, and thus, the cycle characteristics may decrease. In addition, the amount of lithium occluded in the negative electrode binder is insufficient, and thus, the energy density may decrease.

The conditions defined by the above formulas (i) and (ii) are desirably satisfied when the secondary battery is in a state in which rated capacity is obtained. In particular, it is preferred that the battery is in a state in which the amount of electricity exhibited when charge is performed to 4.2 V at constant current (1 C), and then, charge is performed at a constant voltage of 4.2 V, and a total of 2.5 hours (a total time of constant current charge and constant voltage charge) of charge is performed, and discharge is performed to 2.7 V at constant current (1 C) is equal to or more than rated capacity.

The amount of lithium in the negative electrode, $M_a$, corresponds to the difference between the amount of lithium in the negative electrode in the charged state, $M_{a1}$, and the amount of lithium in the negative electrode in the discharged state, $M_{a2}$. The amount of lithium in the positive electrode, $M_c$, corresponds to the difference between the amount of lithium in the positive electrode in the discharged state, $M_{c2}$, and the amount of lithium in the positive electrode in the charged state, $M_{c1}$.

When the negative electrode is doped with lithium, the amount of lithium with which the negative electrode is doped, $M_{Li}$, is equal to the amount of lithium in the negative electrode in the discharged state, $M_{a2}$. In other words, this amount of lithium corresponds to capacity not contributing to charge and discharge reactions, and the amount of lithium with which the negative electrode is doped can be estimated even after first charge and discharge.

The amount of lithium in the positive electrode and the negative electrode in the charged state and the discharged state can be found, for example, by performing quantitative analysis by ICP-AES (inductively coupled plasma-atomic emission spectroscopy). Quantitative analysis can be performed, for example, by ICP-MS (inductively coupled plasma-mass spectrometry) or ion chromatography analysis, other than ICP atomic emission spectroscopy.

The charged state and the discharged state mean states in which rated charge and discharge are performed. A charged state in rated charge and discharge can be defined as a state in which charge is performed to 4.2 V at constant current (1 C), and then, charge is performed at a constant voltage of 4.2 V, where a total of 2.5 hours (a total time of constant current charge and constant voltage charge) of charge is performed, and a discharged state can be defined as a state in which discharge is performed to 2.7 V at constant current (1 C).

The negative electrode binder in this exemplary embodiment preferably has an elastic modulus of 1.5 GPa or more and 5.0 GPa or less. If the elastic modulus is too low, the first charge and discharge characteristics may be insufficient due to insufficient resin strength. If the elastic modulus is too high, the elongation of the resin decreases, which may lead to a rapid decrease in capacity during repeated charge and discharge.

The negative electrode active material layer of the secondary battery according to this exemplary embodiment contains a silicon compound as a negative electrode active material. As this silicon compound, silicon oxide is preferred. The advantages of the silicon compound, particularly silicon oxide, are that it plays the role of a negative electrode active material like a silicon simple substance, and that the volume change is smaller than that of a silicon simple substance. The ratio of the silicon compound in the entire negative electrode active material is preferably 80% by mass or more, more preferably 90% by mass or more.

The negative electrode active material layer of the secondary battery according to this exemplary embodiment can further contain carbon, such as graphite, as the negative electrode active material. When the negative electrode active material layer contains an active material including carbon, it is possible to relieve the expansion and shrinkage of the negative electrode during repeated charge and discharge and ensure the conduction of the silicon compound, the negative electrode active material. When both the silicon compound and carbon coexist, better cycle characteristics are obtained. The ratio of carbon as the negative electrode active material in the entire negative electrode active material is preferably 1% by mass or more, more preferably 3% by mass or more, in terms of obtaining a sufficient addition effect, and is preferably 10% by mass or less, more preferably 8% by mass or less, in terms of sufficiently ensuring the effect of adding the silicon compound.

Note that if small particle diameter particles are included in the negative electrode active material layer, the cycle characteristics tend to decrease. If the particle diameter is too large, the electrical characteristics tend to decrease. Therefore, the average particle diameter $D_{50}$ of active material particles included in the negative electrode active material layer is preferably 0.1 μm or more and 20 μm or less, more preferably 0.5 μm or more and 10 μm or less.

When the silicon compound and carbon are used in combination as the negative electrode active material, the silicon compound and carbon can be simply mixed, and it is also possible to combine carbon on the negative electrode active material surface. For example, a carbon coating layer can be formed around a core of the silicon compound by a method of introducing the silicon compound into an organic compound gas atmosphere under a high temperature non-oxygen atmosphere, or a method of mixing the silicon compound with a carbon precursor resin under a high temperature non-oxygen atmosphere. Thus, volume expansion of the negative electrode in charge and discharge is suppressed, and a further improving effect on cycle characteristics is obtained. However, the electrode density is decreased by the excess amount of carbon coating, and the merit of battery capacity improvement, which is a feature of a silicon active material, decreases. Therefore, it is desired to set the amount of carbon coating considering the desired battery capacity and cycle characteristics.

The negative electrode active material layer can be formed, for example, by dispersing and kneading negative electrode active material particles formed by the above method and a negative electrode binder in a solvent, applying the obtained slurry onto a negative electrode current collector, and drying the slurry in a high temperature atmosphere. The content of the negative electrode binder is preferably 5 parts by mass or more and 25 parts by mass or less, more preferably 5 parts by mass or more and 20 parts by mass or less, with respect to 100 parts by mass of the negative electrode active material. As the solvent, N-methyl-2-pyrrolidone (NMP) and the like are preferred. As the negative electrode current collector, copper, nickel, silver, or alloys thereof are preferred because of their electrochemical stability. Examples of the shape of the negative electrode current collector include foil, a flat plate shape, and a mesh shape. It is also possible to increase electrode density by pressing the negative electrode active material layer at room temperature or high temperature, as required.

The negative electrode active material layer may comprise a conductive agent, such as carbon black or acetylene black, as required, in order to increase conductivity. The content of the conductive agent is preferably 5 parts by mass or less with respect to 100 parts by mass of the negative electrode active material.

The density of the negative electrode active material layer (electrode density) is preferably in the range of 1.0 g/cm$^3$ or more and 2.0 g/cm$^3$ or less. When the electrode density is too low, the charge and discharge capacity tends to decrease. When the electrode density is too high, it is difficult to impregnate the electrodes including the negative electrode with the electrolytic solution, and also, the charge and discharge capacity tends to decrease.

Before the battery is made, the negative electrode can be doped with lithium. Examples of a method for doping the negative electrode with lithium include a method of bringing the negative electrode and lithium into conduction in the presence of an electrolytic solution, and a method of vapor-depositing lithium on the negative electrode active material layers. In addition, it is also possible to dope a powdery negative electrode active material with lithium and form a negative electrode using this doped negative electrode active material.

In the secondary battery according to the exemplary embodiment, as the positive electrode active material included in the positive electrode active material layer, for example, lithium manganate; lithium cobaltate; lithium nickelate; mixtures of two or more of these lithium compounds; compounds in which part or all of the manganese, cobalt, or nickel moiety of the above lithium compounds is substituted by another metal element, such as aluminum, magnesium, titanium, or zinc; iron lithium phosphate, and the like can be used.

In addition, lithium manganate; nickel-substituted lithium manganate in which part of the manganese moiety of lithium manganate is substituted by at least nickel; lithium nickelate; cobalt-substituted lithium nickelate in which part of the nickel moiety of lithium nickelate is substituted by at least cobalt; and active materials in which the manganese or nickel moiety of these lithium compounds is substituted by another metal element (for example, at least one of aluminum, magnesium, titanium, and zinc) can be used. For example, an active material represented by the following composition formula can be used.

$$Li_aNi_bCo_cAl_dO_2$$

(0.80≤a≤1.05, 0.50≤b≤0.95, 0.10≤c≤0.50, and 0.01≤d≤0.15).

The positive electrode active material layer can be formed by dispersing and kneading a positive electrode active material and a positive electrode binder in a solvent, applying the obtained slurry onto a positive electrode current collector, and drying the slurry in a high temperature atmosphere. Examples of a substance mainly used as the positive electrode binder include polyvinylidene fluoride and polytetrafluoroethylene. As the solvent, N-methyl-2-pyrrolidone (NMP) and the like are preferred. As the positive electrode current collector, aluminum and alloys containing aluminum as a main component can be used because high corrosion resistance in an organic electrolytic solution is required.

In the secondary battery according to the exemplary embodiment, as the separator, porous films made of polyolefins, such as polypropylene and polyethylene, fluororesins, polyimides, polyamideimides, and the like can be used.

In the secondary battery according to the exemplary embodiment, as the electrolytic solution, nonaqueous electrolytic solutions in which a lithium salt is dissolved in one or two or more nonaqueous solvents can be used. Examples of the nonaqueous solvent include cyclic carbonates, such as propylene carbonate (PC), ethylene carbonate (EC), butylene carbonate (BC), and vinylene carbonate (VC); chain carbonates, such as dimethyl carbonate (DMC), diethyl carbonate (DEC), ethyl methyl carbonate (EMC), and dipropyl carbonate (DPC); aliphatic carboxylates, such as methyl formate, methyl acetate, and ethyl propionate; γ-lactones, such as γ-butyrolactone; chain ethers, such as 1,2-ethoxyethane (DEE) and ethoxymethoxyethane (EME); and cyclic ethers, such as tetrahydrofuran and 2-methyltetrahydrofuran.

In addition, as the nonaqueous solvent, aprotic organic solvents, such as dimethyl sulfoxide, 1,3-dioxolane, dioxolane derivatives, formamide, acetamide, dimethylformamide, acetonitrile, propionitrile, nitromethane, ethyl monoglyme, phosphate triester, trimethoxymethane, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole, and N-methylpyrrolidone can also be used.

Examples of the lithium salt dissolved in the nonaqueous solvent include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, $LiB_{10}Cl_{10}$, lower aliphatic lithium carboxylate, chloroborane lithium, lithium tetraphenylborate, LiBr, LiI, LiSCN, LiCl, and imides. In addition, instead of nonaqueous electrolytic solutions, polymer electrolytes may be used.

In the secondary battery according to the exemplary embodiment, as the exterior body, can cases, exterior films, and the like can be used. As the can cases, stainless steel cans are often used. As the exterior films, laminate films including thermoplastic resins, such as polyethylene, polypropylene, or ionomer resins in which an ethylene-methacrylic acid copolymer or an ethylene-acrylic acid copolymer is intermolecularly bonded by a metal ion, as adhesive layers, are used.

EXAMPLES

Examples according to this exemplary embodiment will be described below.

Example 1

Silicon oxide particles (silicon/oxygen=1/1.05 (atomic ratio)) in which the average particle diameter $D_{50}$ measured by a laser diffraction-scattering method was adjusted to 5 μm were prepared as a negative electrode active material, and 85 parts by mass of the silicon oxide particles were mixed with 50 parts by mass of a NMP solution of polyamic acid represented by formula (3a) as a binder solution (corresponding to 10 parts by mass of finally obtained polyimide) and 5 parts by mass of a natural graphite powder in which the average particle diameter $D_{50}$ was adjusted to 5 μm, and NMP as a solvent was further added to dissolve and disperse the mixture to make a negative electrode material slurry. This slurry was applied in the shape of a 160×90 mm quadrangle to both surfaces of 10 μm thick copper foil, and the copper foil was dried in a drying furnace at 125° C. for 5 minutes, then compression-molded by a roll press, and dried again in the drying furnace at 300° C. for 10 minutes to form negative electrode active material layers on both surfaces of a negative electrode current collector. Note that the weight of the formed negative electrode active material layers was a weight corresponding to an active material capacity (the first charge capacity of the negative electrode when a potential of 0.02 V was reached with respect to metal lithium, the same applies to negative electrodes below) of 1.2 Ah. One sheet in which negative electrode active material layers were formed on both surfaces of a negative electrode current collector was made in this manner, and punched into the shape of a 160×90 mm quadrangle.

[Formula 5]

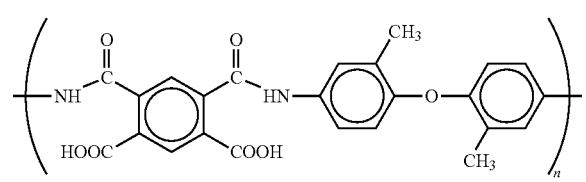

(3a)

On the other hand, 92 parts by mass of positive electrode active material particles made of lithium cobaltate was mixed with 4 parts by mass of polyvinylidene fluoride as a binder and 4 parts by mass of a carbon powder (amorphous carbon powder) as a conductive agent, and NMP as a solvent was further added to dissolve and disperse the mixture to make a positive electrode material slurry. This slurry was applied in the shape of a 160×90 mm quadrangle to one surface of 20 μm thick aluminum foil, and the aluminum foil was dried in a drying furnace at 125° C. for 5 minutes, and then compression-molded by a roll press to form a positive electrode active material layer on one surface of a positive electrode current collector. Note that the weight of the formed positive electrode active material layer was a weight corresponding to an active material capacity (the first charge capacity of the positive electrode when a potential of 4.3 V was reached with respect to metal lithium, the same applies to positive electrodes below) of 1.0 Ah. Two sheets in which a positive electrode active material layer was formed on one surface of a positive electrode current collector were made in this manner, and punched into the shape of a 165×95 mm quadrangle to provide positive electrodes.

Then, separators in the shape of a 170×100 mm quadrangle made of a porous polypropylene film were prepared. Then, a laminate in which the positive electrode, the separator, the negative electrode, the separator, and the positive electrode were superimposed in this order from below was obtained.

Then, a negative electrode terminal made of nickel for taking out the electrode was fused to the negative electrode current collector by ultrasonic bonding. In addition, the two positive electrode current collectors were superimposed on the side opposite to the negative electrode terminal, and a positive electrode terminal made of aluminum for taking out the electrode was fused to the superimposed portion by ultrasonic bonding. In this manner, the positive electrode terminal and the negative electrode terminal were disposed in opposed long side portions, respectively.

Exterior films were superimposed on both sides of the obtained laminate so that the adhesive layers were on the laminated cell sides, and then, three of four sides where the outer peripheral portions of the exterior films overlapped each other were heat sealed (sealed). Then, an electrolytic solution was injected, and the remaining one side was heat sealed under vacuum.

Here, as the electrolytic solution, a solution obtained by dissolving $LiPF_6$ at a concentration of 1 mol/l in a solvent obtained by mixing EC, DEC, and EMC at a volume ratio of 3:5:2 was used. In the laminate type battery obtained thus, the tips of the negative electrode terminal and the positive electrode terminal protrude outside from the exterior film in directions opposite to each other. Seven of the laminate type batteries were made.

First, discharge capacity when the obtained five laminate type batteries were fully charged to 4.2 V, which was the rating, and then discharged to 2.7 V under an atmosphere at a constant temperature of 20° C. was measured. This was first discharge capacity, that is, charge and discharge capacity. Then, under an atmosphere at a constant temperature of 45° C., for each laminate type battery, charge to 4.2 V and discharge to 2.7 V were repeated 100 times at 1 C rate, and discharge capacity after the 100 cycles was measured at 20° C. Note that the 1 C rate refers to the value of current at which nominal capacity (Ah) is charged and discharged in 1 hour. Then, the proportion of the discharge capacity after the 100 cycles to the first discharge capacity was calculated, and this was taken as cycle characteristics.

Further, the thickness of each laminate type battery was measured before the start of the cycle and after the 100 cycles, and the cell thickness increase rate was calculated.

The respective average values of the first discharge capacity, the cycle characteristics, and the cell thickness increase rate in the obtained five laminate type batteries are shown in Table 1.

Example 2

Laminate batteries were made using an NMP solution of polyamic acid represented by formula (4a) as a binder solution. Except for this, Example 2 was carried out as in Example 1. The respective average values of first discharge capacity, cycle characteristics, and cell thickness change rate in the obtained five laminate type batteries are shown in Table 1.

[Formula 6]

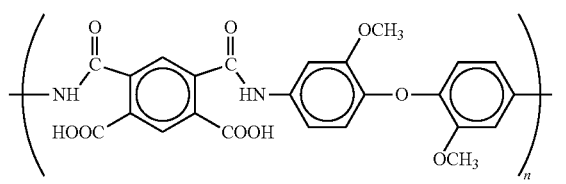

(4a)

Example 3

90 Parts by mass of silicon oxide particles were prepared as a negative electrode active material, and 25 parts by mass of an NMP solution of polyamic acid represented by formula (3a) (corresponding to 5 parts by mass of finally obtained polyimide) was prepared as a binder solution. Except for this, Example 3 was carried out as in Example 1. The respective average values of the evaluation results of first discharge capacity, cycle characteristics, and cell thickness change rate in the obtained five laminate type batteries are shown in Table 1.

Example 4

75 Parts by mass of silicon oxide particles were prepared as a negative electrode active material, and 100 parts by mass of an NMP solution of polyamic acid represented by formula (3a) (corresponding to 20 parts by mass of finally obtained polyimide) was prepared as a binder solution. Except for this, Example 4 was carried out as in Example 1. The respective average values of the evaluation results of first discharge capacity, cycle characteristics, and cell thickness change rate in the obtained five laminate type batteries are shown in Table 1.

Example 5

Silicon oxide particles (silicon/oxygen=1/1.05 (atomic ratio)) in which the average particle diameter $D_{50}$ measured by a laser diffraction-scattering method was adjusted to 5 μm were prepared as a negative electrode active material, 85 parts by mass of the silicon oxide particles and 10 parts by mass of a phenolic resin (corresponding to 5 parts by mass of graphite) were mixed, and fired under a nitrogen atmosphere at 1000° C. to replace 85 parts by mass of the silicon oxide particles and 5 parts by mass of the natural graphite powder in Example 1. Example 5 was carried out with other conditions, such as a binder, being the same as those in Example 1. The respective average values of the evaluation results of first discharge capacity, cycle characteristics, and cell thickness change rate in the obtained five laminate type batteries are shown in Table 1.

Example 6

The weight of formed negative electrode active material layers was a weight corresponding to an active material capacity of 1.2 Ah as in Example 1. Metal lithium with a weight corresponding to an active material capacity (the capacity of lithium with which the negative electrode was doped) of 0.10 Ah was vapor-deposited on negative electrode active material layers formed on both surfaces of a negative electrode current collector to provide a negative electrode. Example 6 was carried out with other conditions being the same as those in Example 1. The respective average values of the evaluation results of first discharge capacity, cycle characteristics, and cell thickness change rate in the obtained five laminate type batteries are shown in Table 1.

Example 7

The weight of formed negative electrode active material layers was a weight corresponding to an active material capacity of 1.6 Ah unlike Example 1. Metal lithium with a weight corresponding to an active material capacity (the capacity of lithium with which the negative electrode was doped) of 0.40 Ah was vapor-deposited on negative electrode active material layers formed on both surfaces of a negative electrode current collector to provide a negative electrode. Example 7 was carried out with other conditions being the same as those in Example 1. The respective average values of the evaluation results of first discharge capacity, cycle characteristics, and cell thickness change rate in the obtained five laminate type batteries are shown in Table 1.

Example 8

The weight of formed negative electrode active material layers was a weight corresponding to an active material capacity of 1.9 Ah unlike Example 1. Metal lithium with a weight corresponding to an active material capacity (the capacity of lithium with which the negative electrode was doped) of 0.60 Ah was vapor-deposited on negative electrode active material layers formed on both surfaces of a negative electrode current collector to provide a negative electrode. Example 8 was carried out with other conditions being the same as those in Example 1. The respective average values of the evaluation results of first discharge capacity, cycle characteristics, and cell thickness change rate in the obtained five laminate type batteries are shown in Table 1.

Comparative Example 1

Laminate batteries were made using an NMP solution of polyamic acid represented by formula (5) as a binder solution. Except for this, Comparative Example 1 was carried out as in Example 1. The respective average values of first discharge capacity, cycle characteristics, and cell thickness change rate in the obtained five laminate type batteries are shown in Table 1.

[Formula 7]

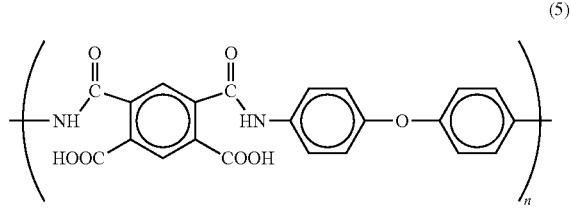

(5)

Reference Example 1

92 Parts by mass of silicon oxide particles were prepared as a negative electrode active material, and 15 parts by mass of an NMP solution of polyamic acid represented by formula (3a) (corresponding to 3 parts by mass of finally obtained polyimide) was prepared as a binder solution. Except for this, Reference Example 1 was carried out as in Example 1. The respective average values of the evaluation results of first discharge capacity, cycle characteristics, and cell thickness change rate in the obtained five laminate type batteries are shown in Table 1.

Reference Example 2

65 Parts by mass of silicon oxide particles were prepared as a negative electrode active material, and 150 parts by mass of an NMP solution of polyamic acid represented by formula (3a) (corresponding to 30 parts by mass of finally obtained polyimide) was prepared as a binder solution. Except for this, Reference Example 2 was carried out as in Example 1. The respective average values of the evaluation results of first discharge capacity, cycle characteristics, and cell thickness change rate in the obtained five laminate type batteries are shown in Table 1.

(Measurement of Amount of Lithium in Negative Electrode Active Material, A, and Amount of Lithium in Negative Electrode Binder, B, during Discharge)

For the negative electrode active material layers formed on both surfaces of the negative electrode current collector, the measurement of the amount of lithium in the active material, A, and the amount of lithium included in the binder itself, B, was performed by the charge and discharge of a lithium counter electrode coin type battery as follows.

A negative electrode punched into the shape of a φ12 mm disk, and a separator made of a porous polypropylene film punched into the shape of a φ21 mm disk were laminated in this order on a lower lid of a φ23×20 mm coin type battery, and an electrolytic solution was injected. Further, φ15 mm, 1.5 mm thick disk-shaped metal lithium was superimposed thereon, and finally, an upper lid was placed, and sealing was performed using a caulking machine.

First, under an atmosphere at a constant temperature of 20° C., the obtained coin type battery was charged to 0.02 V at 0.025 C rate (the voltage was in the decreasing direction) with a metal lithium counter electrode, and then discharged to 2.0 V at 0.025 C rate (the voltage was in the increasing direction). The amount of lithium at this point is the total amount of lithium in the active material and the binder itself during discharge. The upper lid of the above coin type battery was peeled, and the negative electrode was removed from the battery. The amount of lithium in this negative electrode, M1, was found by performing quantitative analysis by ICP-AES (inductively coupled plasma-atomic emission spectroscopy).

Apart from the above battery, a coin type battery was made in the same manner as described above, using polyvinylidene fluoride, instead of a polyimide, as a binder, and the amount of lithium in the negative electrode for which charge and discharge were performed, M2, was measured in the same manner.

The amount of lithium in the active material during discharge, A, matches the amount of lithium in a negative electrode when polyvinylidene fluoride having no lithium occlusion function is used as a binder. On the other hand, the amount of lithium included in the binder itself during discharge, B, is found by measuring the difference between the amount of lithium in a negative electrode using a material having a lithium occlusion function as a binder and the amount of lithium in a negative electrode using a material having no lithium occlusion function as a binder. In other words, the relations A=M2 and $B=M1-M2$ hold.

A/B obtained by the above analysis is shown in Table 1. The amount of lithium in the Table is represented with the relative ratio of the number of atoms using B in Example 1 as a reference (1).

TABLE 1

| | | Content ratio (mass ratio) | | | Evaluation results | | | |
|---|---|---|---|---|---|---|---|---|
| | Binder No. | Silicon oxide | Carbon | Binder | Amount of lithium during discharge (A/B) | First discharge capacity (mAh) | Cycle characteristics (%) | Cell thickness increase rate (%) |
| Example 1 | (3) | 85 | 5 | 10 | 5.9 | 821 | 84 | 9 |
| Example 2 | (4) | 85 | 5 | 10 | 6.0 | 819 | 83 | 9 |
| Example 3 | (3) | 90 | 5 | 5 | 14 | 843 | 72 | 10 |
| Example 4 | (3) | 75 | 5 | 20 | 2.5 | 807 | 85 | 8 |
| Example 5 | (3) | 85 | 5 (Resin firing) | 10 | 4.7 | 810 | 83 | 8 |
| Example 6 | (3) | 85 | 5 | 10 | 6.2 | 888 | 92 | 9 |
| Example 7 | (3) | 85 | 5 | 10 | 6.5 | 944 | 92 | 9 |
| Example 8 | (3) | 85 | 5 | 10 | 6.9 | 953 | 91 | 10 |
| Comparative Example 1 | (5) | 85 | 5 | 10 | 5.5 | 804 | 68 | 11 |
| Reference Example 1 | (3) | 92 | 5 | 3 | 21 | 772 | 34 | 15 |
| Reference Example 2 | (3) | 65 | 5 | 30 | 1.6 | 767 | 86 | 8 |

In the lithium ion secondary batteries according to this exemplary embodiment, superiority over the laminate type battery of Comparative Example 1 can be determined as follows. Regarding the first discharge capacity, 804 mAh or more, which is equal to or more than the first discharge capacity of Comparative Example 1, can be determined to be superior. Regarding the cycle characteristics for 100 cycles at 45° C., not less than 68%, which is the cycle characteristics of Comparative Example 1, can be determined to be superior. Further, regarding the cell thickness change rate, not more than 11%, which is a level close to the cell thickness change rate of Comparative Example 1 in Table 1, can be determined to be superior. The laminate type batteries obtained in Examples 1 to 5 satisfy all conditions, and therefore can be determined to be superior.

From the evaluation results of Examples 1 and 2 and Comparative Example 1 shown in Table 1, the following is found. When an alkyl group or an alkoxy group is included in a phenyl group in the polyimide of a negative electrode binder, the reaction of lithium and the polyimide occurs, which leads to an improvement in first discharge capacity, and an improvement in cycle characteristics due to an improvement in conductivity.

In Examples 1, 3, and 4 and Reference Examples 1 and 2, the results in the case of using the same type of binder are shown. In Reference Example 1, A/B is more than 20, and the adhesiveness is low due to a too small amount of the binder, and therefore, the cycle characteristics decrease. In addition, the decrease in the adhesiveness of the binder leads to a cell resistance increase, and therefore, the first discharge capacity also decreases though the ratio of silicon oxide is high. In Reference Example 2, A/B is less than 2, and the ratio of silicon oxide is low due to a too large amount of the binder, and therefore, the first discharge capacity decreases.

In Example 1, an example in which silicon oxide and a natural graphite powder are mixed is shown, but the making of a negative electrode is not limited to this. Even if silicon oxide particles and a phenolic resin are mixed, and fired under a nitrogen atmosphere, as in Example 5, the same characteristics can be obtained. From this, it is found that good first discharge capacity and cycle characteristics can be obtained by using a negative electrode including silicon oxide and carbon, regardless of the method of making a negative electrode.

In Examples 6, 7, and 8, examples are shown in which the weight of formed negative electrode active material layers is a weight corresponding to an active material capacity of 1.2 to 1.9 Ah, and metal lithium is vapor-deposited on negative electrode active material layers formed on both surfaces of a negative electrode current collector to provide a negative electrode. As shown by these examples, it is found that when a negative electrode is doped with lithium, combined with the use of a particular negative electrode binder, the first discharge capacity and the cycle characteristics are further improved.

Here, in Examples 6, 7, and 8, the weight of the negative electrode active material layers is a weight corresponding to an active material capacity of 1.2 to 1.9 Ah, and the weight of the positive electrode active material layers is a weight corresponding to an active material capacity of 1.0 Ah, that is, the capacity ratio of the negative electrode to the positive electrode is in the range of 1.2 to 1.9. Therefore, it is desired that the capacity ratio is in this range, and that the negative electrode is doped with lithium. Note that the capacity ratio of the negative electrode to the positive electrode corresponds to Ma/Mc, wherein the amount of lithium inserted into the negative electrode until the negative electrode reaches a potential of 0.02 V with respect to metal lithium is $M_a$ (the number of atoms), and the amount of lithium released from the positive electrode until the positive electrode reaches a potential of 4.3 V with respect to metal lithium is $M_c$ (the number of atoms). In other words, $1.2 \leq Ma/Mc \leq 1.9$ is desired.

If Ma/Mc is small, there is a tendency that the cycle characteristics are less likely to be improved. If Ma/Mc is large, there is a tendency that the first discharge capacity is less likely to be improved, and that the energy density decreases by an increment in negative electrode weight.

As shown above, according to this exemplary embodiment, better characteristics than those of usual lithium ion secondary batteries can be obtained in the initial characteristics and energy density of the battery, and further in cycle characteristics after 100 cycles at 45° C.

While the present invention has been described with reference to the exemplary embodiments and Examples, the present invention is not limited to the above exemplary embodiments and Examples. Various modifications understandable to those skilled in the art may be made to the constitution and details of the present invention within the scope thereof.

This application claims the right of priority based on Japanese Patent Application No. 2011-207690, filed on Sep. 22, 2011, the entire disclosure of which is incorporated herein by reference.

INDUSTRIAL APPLICABILITY

Lithium ion secondary batteries according to this exemplary embodiment can be used for products to which lithium ion secondary batteries can be applied, such as applications for energy regeneration in electric cars, engine drive, applications for storage by combination with solar batteries, emergency power supplies for industrial equipment, and the drive of consumer equipment.

REFERENCE SIGNS LIST 1 negative electrode active material layer
2 negative electrode current collector
3 positive electrode active material layer
4 positive electrode current collector
5 separator
6 negative electrode terminal
7 positive electrode terminal
8 exterior body

The invention claimed is:

1. A lithium ion secondary battery comprising a positive electrode, a separator, and a negative electrode opposed to the positive electrode with an intervention of the separator, wherein
the negative electrode comprises a negative electrode active material comprising at least a silicon compound, and a negative electrode binder,
the negative electrode binder comprises a polyimide represented by formula (1):

[Formula 1]

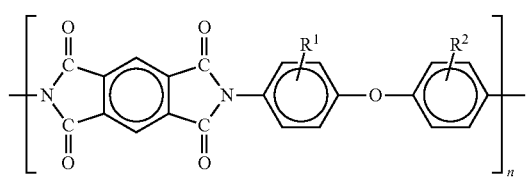

wherein $R^1$ and $R^2$ each independently represent an alkyl group, an alkoxy group, an acyl group, a phenyl group, or a phenoxy group, and
lithium is occluded in both the negative electrode active material and the negative electrode binder even during discharge.

2. The lithium ion secondary battery according to claim 1, wherein the polyimide can form a lithium polyimide represented by formula (2):

[Formula 2]

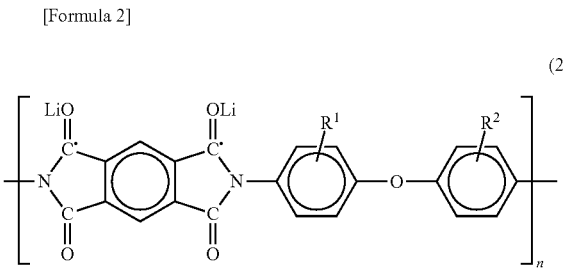

(2)

wherein $R^1$ and $R^2$ represent the same groups as $R^1$ and $R^2$ in formula (1), respectively, by a reversible reaction with lithium ions, with charge and discharge.

3. The lithium ion secondary battery according to claim 1, wherein $R^1$ and $R^2$ in formula (1) are each independently an alkyl group or an alkoxy group.

4. The lithium ion secondary battery according to claim 1, wherein $R^1$ and $R^2$ in formula (1) are each independently a methyl group or a methoxy group.

5. The lithium ion secondary battery according to claim 1, wherein the negative electrode binder comprises a polyimide represented by formula (3) or formula (4):

[Formula 3]

(3)

[Formula 4]

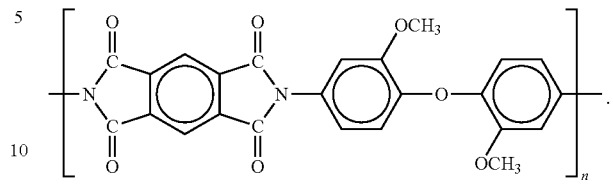

(4)

6. The lithium ion secondary battery according to claim 1, wherein the negative electrode is doped with lithium.

7. The lithium ion secondary battery according to claim 1, wherein the following formula (i) is satisfied:

$$1.2 \leq M_a/M_c \leq 1.9 \quad (i)$$

wherein an amount of lithium inserted into the negative electrode until the negative electrode reaches a potential of 0.02 V with respect to metal lithium is $M_a$ (a number of atoms), and an amount of lithium released from the positive electrode until the positive electrode reaches a potential of 4.3 V with respect to metal lithium is $M_c$ (a number of atoms).

8. The lithium ion secondary battery according to claim 1, wherein the following formula (ii) is satisfied:

$$2 \leq A/B \leq 20 \quad (ii)$$

wherein an amount of lithium (a number of atoms) in the negative electrode active material and an amount of lithium (a number of atoms) in the negative electrode binder during discharge when battery voltage is 3.0 V or less are A and B, respectively.

9. The lithium ion secondary battery according to claim 1, wherein the silicon compound is silicon oxide.

10. The lithium ion secondary battery according to claim 1, wherein the negative electrode further comprises carbon as the negative electrode active material.

11. The lithium ion secondary battery according to claim 10, wherein a content of the carbon is 1% by mass or more and 10% by mass or less with respect to the entire negative electrode active material.

12. The lithium ion secondary battery according to claim 1, wherein a content of the negative electrode binder is 5 parts by mass or more and 25 parts by mass or less with respect to 100 parts by mass of the negative electrode active material.

\* \* \* \* \*